United States Patent
Yang et al.

(10) Patent No.: US 6,914,773 B2
(45) Date of Patent: Jul. 5, 2005

(54) PORTABLE COMPUTER SYSTEM AND ASSEMBLING METHOD THEREOF

(75) Inventors: Myeong Kyoo Yang, Suweon-si (KR); Joung Sea Park, Seoul (KR); Dong Joon Choi, Seongnam-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/341,346

(22) Filed: Jan. 14, 2003

(65) Prior Publication Data

US 2004/0042160 A1 Mar. 4, 2004

(30) Foreign Application Priority Data

Aug. 29, 2002 (KR) .............................. 10-2002-0051612

(51) Int. Cl.$^7$ ................................................. G06F 1/16
(52) U.S. Cl. ...................................... 361/681; 361/679
(58) Field of Search .............................. 361/679–681, 361/683–686

(56) References Cited

U.S. PATENT DOCUMENTS

| | | | | |
|---|---|---|---|---|
| 5,123,419 A | * | 6/1992 | Platt et al. .................. | 600/510 |
| 5,710,728 A | * | 1/1998 | Danielson et al. .......... | 713/321 |
| 6,101,087 A | * | 8/2000 | Sutton et al. ............... | 361/686 |
| 6,229,695 B1 | | 5/2001 | Moon | |
| 6,356,422 B1 | * | 3/2002 | Bilac et al. ................. | 361/93.1 |
| 6,532,152 B1 | * | 3/2003 | White et al. ................ | 361/692 |
| 2002/0126236 A1 | * | 9/2002 | Hiratzuka et al. | |
| 2002/0154474 A1 | * | 10/2002 | Merz et al. | |
| 2003/0184961 A1 | * | 10/2003 | Ahn | |

* cited by examiner

*Primary Examiner*—Yean-Hsi Chang
(74) *Attorney, Agent, or Firm*—Fleshner & Kim, LLP (57) ABSTRACT

An improved portable computer system and corresponding assembly method are provided. A display and input device are joined to a front cover of the computer system, and control circuitry is installed on the rear cover. The front cover and rear cover are then joined to complete assembly of the computer system. A series of simplified attachment mechanisms facilitate ease of assembly, and the addition of barriers between components helps inhibit entry of external contaminants into the system. This improved system provides for simple assembly, disassembly and reassembly for repair, while also providing improved resistance to contamination, thus yielding a more cost effective and reliable product.

33 Claims, 8 Drawing Sheets

PORTABLE COMPUTER SYSTEM AND ASSEMBLING METHOD THEREOF

BACKGROUND OF THE INVENTION

1. Field of the Invention

The present invention relates to at least a portable computer system.

2. Background of the Related Art

Electronics are common in everyday life. Examples of electronics are portable computers, desktop computers, and handheld computers. When consumers choose to buy electronics, many considerations may be taken into account, such as the price of an electronic device, a warranty on the electronic device, and a cost of repair of the electronic device. In some circumstances, an expected cost of repair can be a major factor in the consumer's selection of an electronic device. Likewise, if the manufacturer of an electronic device provides a warranty to the consumer and the expected cost for repair of the electronic device is high, then this will raise the cost of the electronic device.

Some minor repairs to an electronic device may be cost prohibitive because the electronic device must be disassembled, fixed, and then reassembled again. In these prohibitively expensive circumstances, the reassembling of the electronic device may be much more expensive than actually correcting the minor problem. Accordingly, there is a long felt need for electronic devices to be designed such that expected repairs are not cost prohibitive.

SUMMARY OF THE INVENTION

Embodiments of the present invention relate to a method including the following steps. Attaching a display to a front cover. Attaching control circuitry to a back cover. Attaching the front covet and the back cover.

In embodiments of the present invention, attaching the display to a front cover is a relatively expensive task. This may be due to the necessary care that must be taken to prevent dust from becoming trapped between the display and the front cover. Trapped dust may prohibit a clear view of the display through the front cover. However, in embodiments of the present invention, control circuitry (e.g. a variety of electrical devices working cooperatively) may be easily repaired if accessible without detaching the display from the front cover. Accordingly, in embodiments of the present invention, the display is attached to the front cover and the control circuitry is attached to the back cover. When the front cover and back cover are attached together, the display and the control circuitry will be connected. These embodiments may be advantageous, as if a component in the control circuitry is broken and can be easily fixed, the apparatus can be disassembled, fixed and reassembled at a relatively low cost. For instance, in many circumstances, a component of the control circuitry can be fixed without having to reassemble the display to the front cover which would be relatively expensive.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

A notebook computer, portable computer, or a portable digital terminal can be roughly classified into different types. One type is a keyboard pad type where a keyboard, as a basic input unit is installed with operations performed mainly by the keyboard and pen playing an auxiliary function as a pointing device. Another type is a touch pad type where a computer is taken by one hand and the computer is operated by the other hand or pen taken by the other hand only, so that work may be performed conveniently while moving.

A portable computer denoted by a notebook computer is light in its weight, small in its volume, and easy to carry compared with a general desktop type computer, which provides a lot of convenience not obtained by the general desktop type computer. A portable computer may have few limitations in the location of use, thereby greatly extending utilization scope of a computer.

Figure 1:
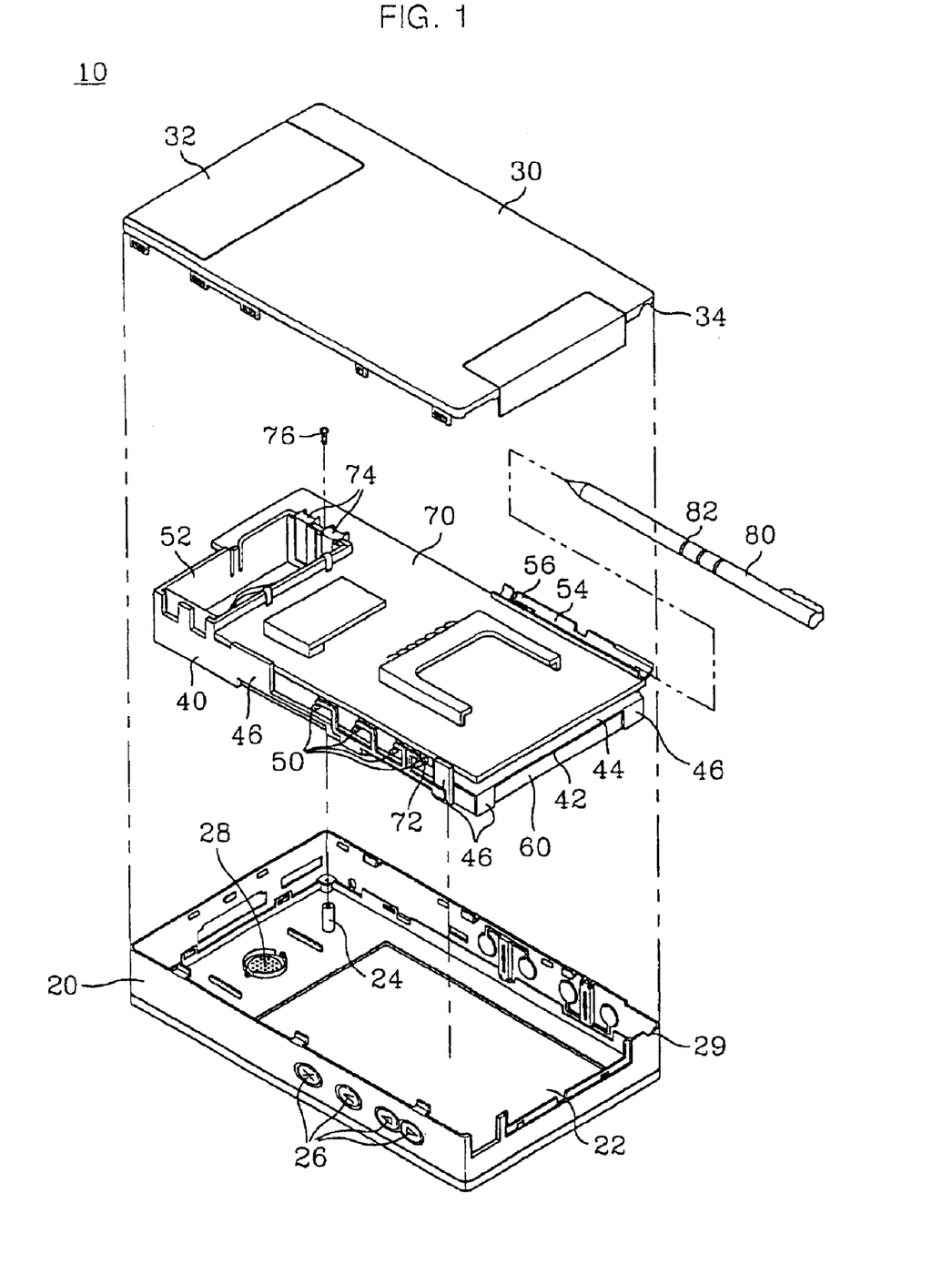
FIG. 1 is an exemplary exploded perspective view of a portable computer system having a frame on which a plurality of devices could be mounted.

FIG. 1 is a perspective view of a wallet type PC (Personal Computer). Hardware of a wallet PC includes a front housing 20, a rear housing 30, a frame 40, a screen 60, and a board 70. The frame 40, the screen 60, and the board 70 are installed in an inner space formed by joining of the front housing 20 and the rear housing 30. The screen 60 and the board 70 are joined on the frame 40.

The screen 60 and the board 70 have a structure not directly joined to the front housing 20 or the rear housing 30. Thanks to such structure, impulse is not directly transferred to the screen 60 and the board 70 in case that impulse is exerted on the housings 20 and 30 from the outside. Therefore, such structure could prevent the screen 60 and the board 70 from being destroyed due to impulse from the outside. The frame 40 is configured such that the frame is safely seated between the front housing 20 and the rear housing 30. This frame 40 is joined to the front housing 20 by a screw 76. The screw 76 is joined to a boss 24 formed on the front housing 20 through a fixed rib formed on the frame 40. The frame 40 is configured such that the frame is jointed to the front housing by one single screw 76 only. Also, the frame 40 is possibly configured such that the frame is joined to the rear housing 30 and the frame 40 is possibly joined to the front housing 20 or the rear housing 30 by a variety of methods.

The frame 40 has a first plane 42 opposing a second plane 44. The first plane 42 and the second plane 44 could be one of arbitrary planes on the frame 40. The screen 60 is joined on the first plane 42 and the board 70 is joined on the second plane 44. A display of the screen is exposed to the outside through an opening 22 formed on the front housing 20. For structure to join the screen 60 and the board 70 to the frame 40, a variety of methods could be used.

A plurality of supporting ribs 46 is used. The supporting ribs 46 are formed from a side of the frame 40. Namely, the supporting ribs 46 are formed from sides of the first plane 42 and the second plane 44. Such structure means that a plurality of devices could be jointed on the frame 40 in a stacking manner. The board 70 could maintain a constant height from the second plane 44, which could be effectively used in case that electronic circuits are installed on both sides of the board 70. Such structure could also be realized by a variety of methods. Ribs 46 are formed on the second plane 44 so that the ribs support the board 70.

A battery case 52 is formed on the frame 40 as one body. A battery (not shown) is insetted into the battery case 52. The battery is attached and detached to and from the battery case 52 through a door 32 formed on the rear housing 30. A speaker mounting portion 28 is formed so that a speaker is installed inside the front housing 20, on which the battery case 52 is positioned. According to such structure, effective use of an inner space of the wallet PC 10 is possible and easy assembling or disassembling of the speaker is possible. The speaker is possibly joined or disassembled through the door 32 without disassembling of the wallet PC 10. Battery terminals 74 could be mounted on the board 70. The battery terminals 74 are directly joined to the battery case 52 when the board 70 is joined to the frame 40.

Switches 72 having a variety of functions could be installed on the board 70. For example, a variety of function buttons are provided. Switches 72 are operated by buttons 26 installed on the front housing 20. There is difficulty of constructing an electronic circuit in a small space, for the wallet PC 10 is manufactured in a small scale. Positions of the buttons 26 for operating the switches 72 are configured such that the positions correspond to the switches 72. The switches 72 should be within a movement range of the corresponding buttons 26. If not positioned in a movement range of the buttons 26, the switches 72 will not operate properly. Mediums 50 are used in case that the switches 72 are not positioned in a movement range of the buttons 26. The mediums 50 are formed together with the frame 40. These mediums 50 are positioned respectively between the switches 72 and the buttons 26. If a user from the outside presses one of the buttons 26 in order to operate a predetermined function, a medium corresponding to that button is operated. Then, a switch corresponding to that medium is operated. Therefore, thanks to the mediums 50, the switches 72 are normally operated even in case that the switches 72 are not positioned in a movement range of the buttons 26.

The wallet PC 10 could use a data input method where data is input on the screen 60 through a stylus 80. The stylus 80 is also called a pen or pen stylus. For a stylus input method, a variety of technologies could be used. For example, there is a technology using a conductive stylus for a stylus input method. The conductive stylus is connected to the wallet PC through a cord. The cord has an inner conductor for electrically connecting the stylus and the wallet PC so that a writing function on the screen is possible. The wallet PC 10 may use a screen write technology not requiring a cord. The screen used for such technology is also called a touch screen. Also, the wallet PC 10 could be equipped with the stylus 80 in its inside. The stylus 80 is mounted on a supporter 54 formed on the frame 40. The supporter 54 could be constructed in a variety of forms. The supporter 54 is configured such that an inner plane of the supporter has the same shape as the outer periphery of the stylus 80. The stylus is configured such that the stylus is fixed by a hook 56 when mounted on the supporter 54 so that it may not be detached arbitrarily from the supporter 54. The hook 56 is joined to a groove 82 formed on the outer periphery of the stylus 80, preventing the stylus 80 from being detached from the supporter 54. The hook 56 is formed in a direction the stylus 80 is attached and detached to and from the supporter 54. This hook 56 is formed in form of a free end.

Due to such free end structure, the hook 56 could move elastically on an inner plane of the supporter 54. Also, this hook 56 is formed such that the hook is projected in a direction it contacts the outer periphery of the stylus 80. A first notch 29 is formed on the front housing 20 and a second notch 34 is formed on the rear housing 30. The first and the second notches 29 and 34 form an opening when the front housing 20 and the rear housing 30 are joined. The stylus 80 is attached and detached to and from the supporter 54 through the opening formed by the first and the second notches 29 and 34. The screen 60 and the board 70 of such wallet PC 10 are joined to the frame 40 and positioned in an inside of the wallet PC 10. The screen 60 and the board 70 do not have joining relation with the front housing 20 and the rear housing 30.

The frame 40 is joined to the front housing 20 by one single screw 76 and the screen 60 and the board 70 are supported by the frame 40. For the portion on which the screen 60 comes in contact with the front housing 20, an insulating element (not shown) having elasticity could be used. Also, the battery case 52 could be formed together with the frame 40. The battery terminals 74 formed on the battery case 52 could be installed on the board 70. The battery terminals 74 are directly joined to the battery case 52 when the board 70 is joined to the frame 40.

However, assembly process in which the screen and the board are jointed sequentially starting from one side (top or bottom case) and the rest case is fastened has disadvantages. In such process, all parts should be joined at a time during manufacturing process and a problem that all parts should be disassembled in case that repair for only the board or the screen is performed, emerges. Also, a supporting rib preparing for a collision of a lower case is provided, but it is vulnerable to impulse directly exerted on the screen. For example, as the screen is exposed to the outside through the opening portion of the wallet PC, there is a strong possibility of inflow of extraneous matter (e.g. dust) from the outside and a problem of destruction due to a direct impulse, emerges.

Figure 2:
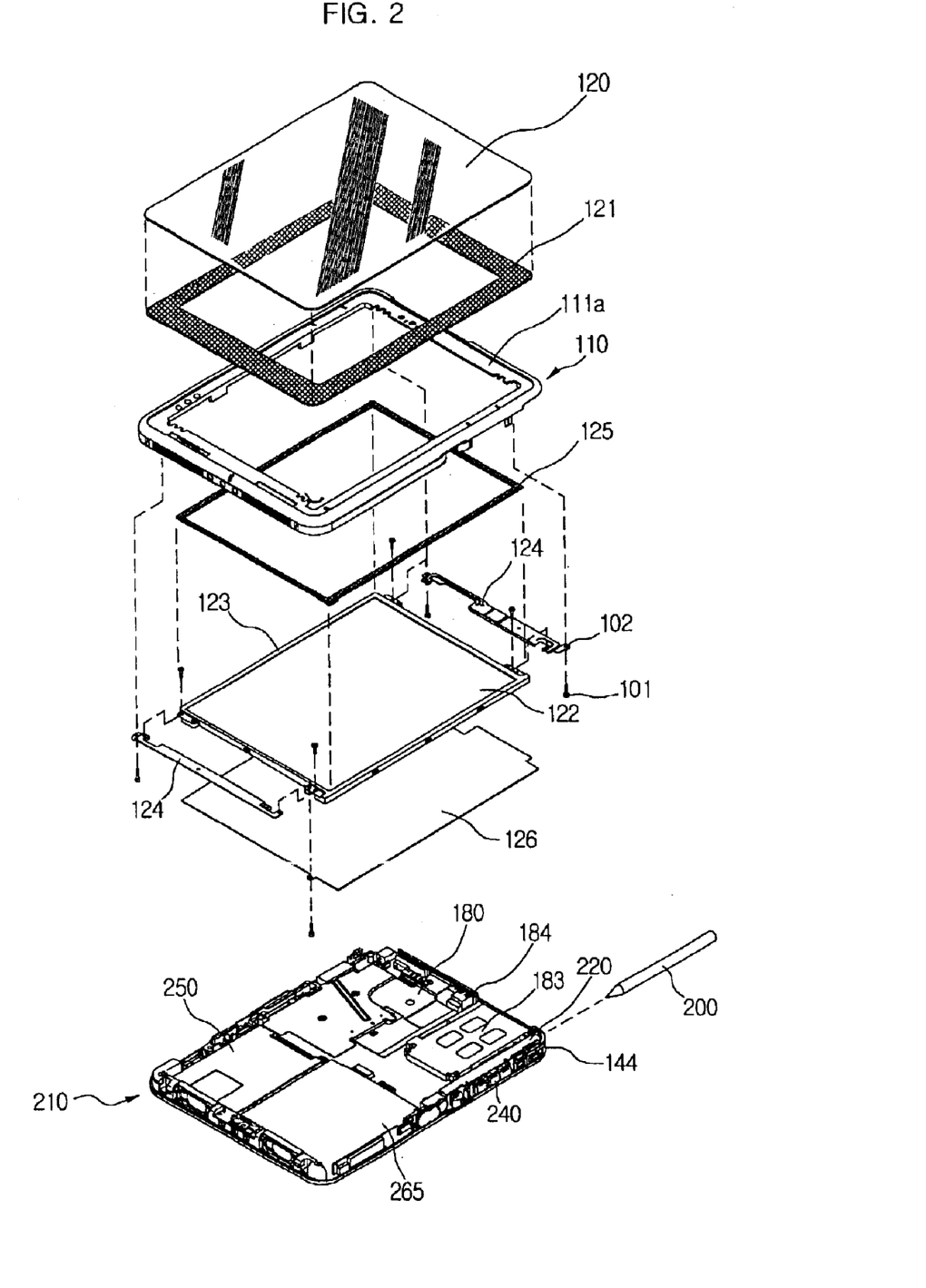
FIG. 2 is an exemplary exploded perspective view of a portable computer system.
Figure 3:
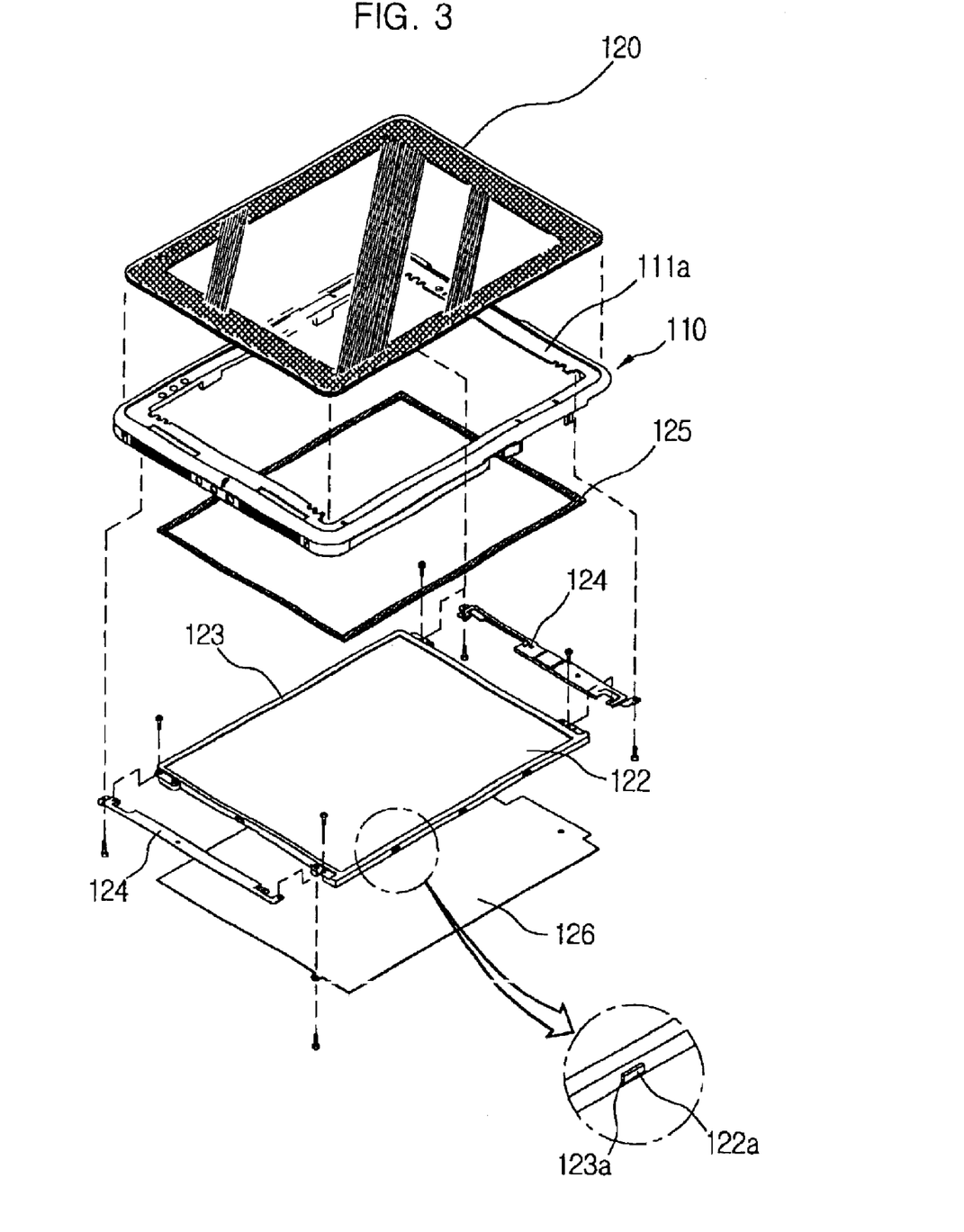
FIG. 3 and FIG. 4 are exemplary drawings illustrating examples of a joining process for a transparent panel and display panel in a portable computer system.
Figure 4:
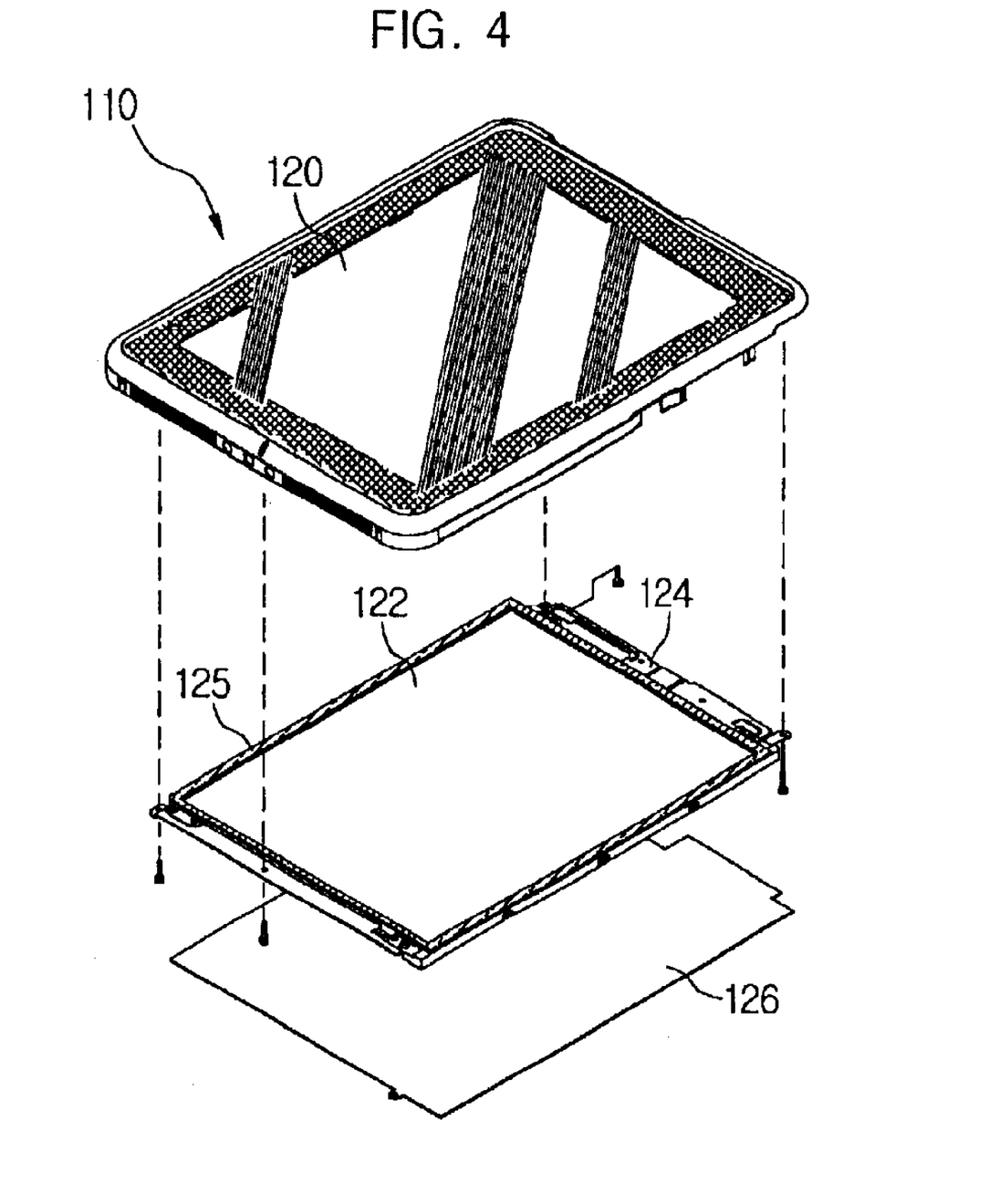
Figure 5:
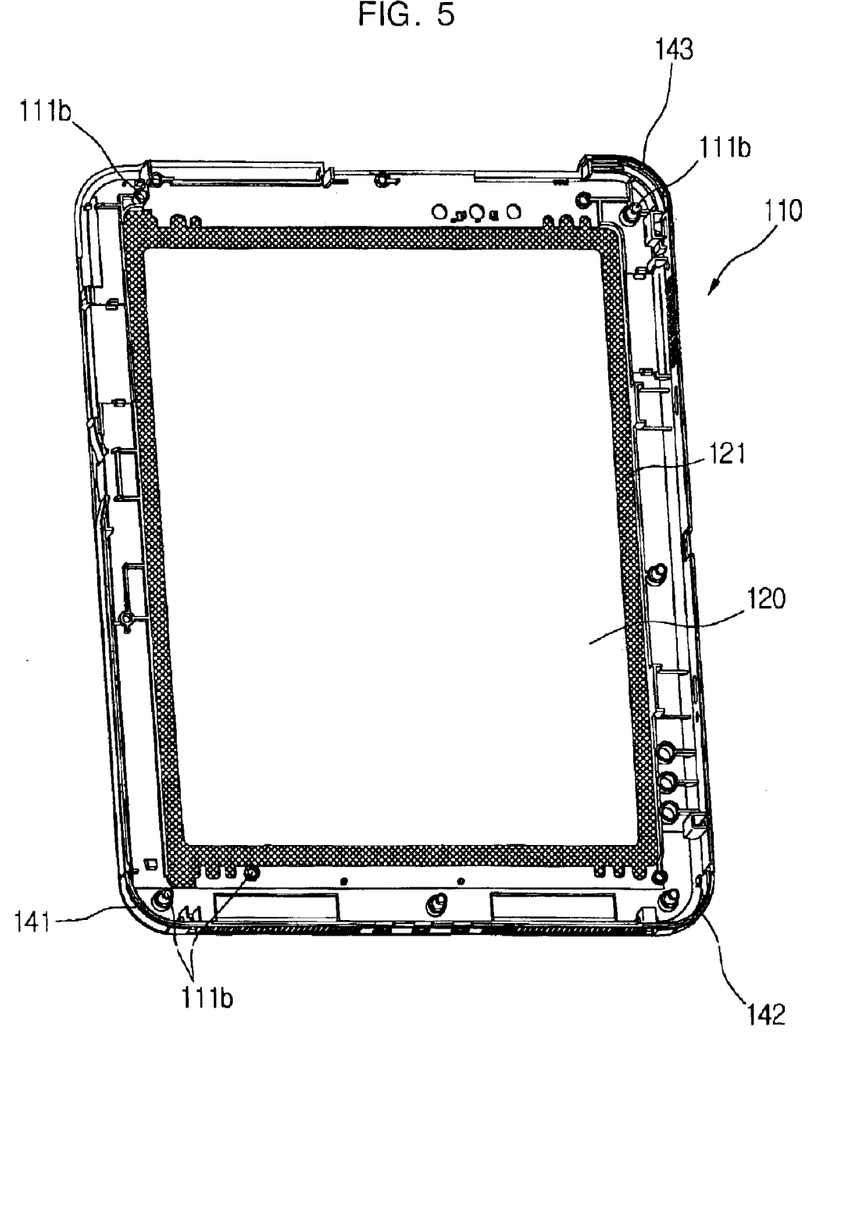
FIG. 5 is a backside perspective view of a front cover to which a transparent panel is attached in a portable computer system.
Figure 6:
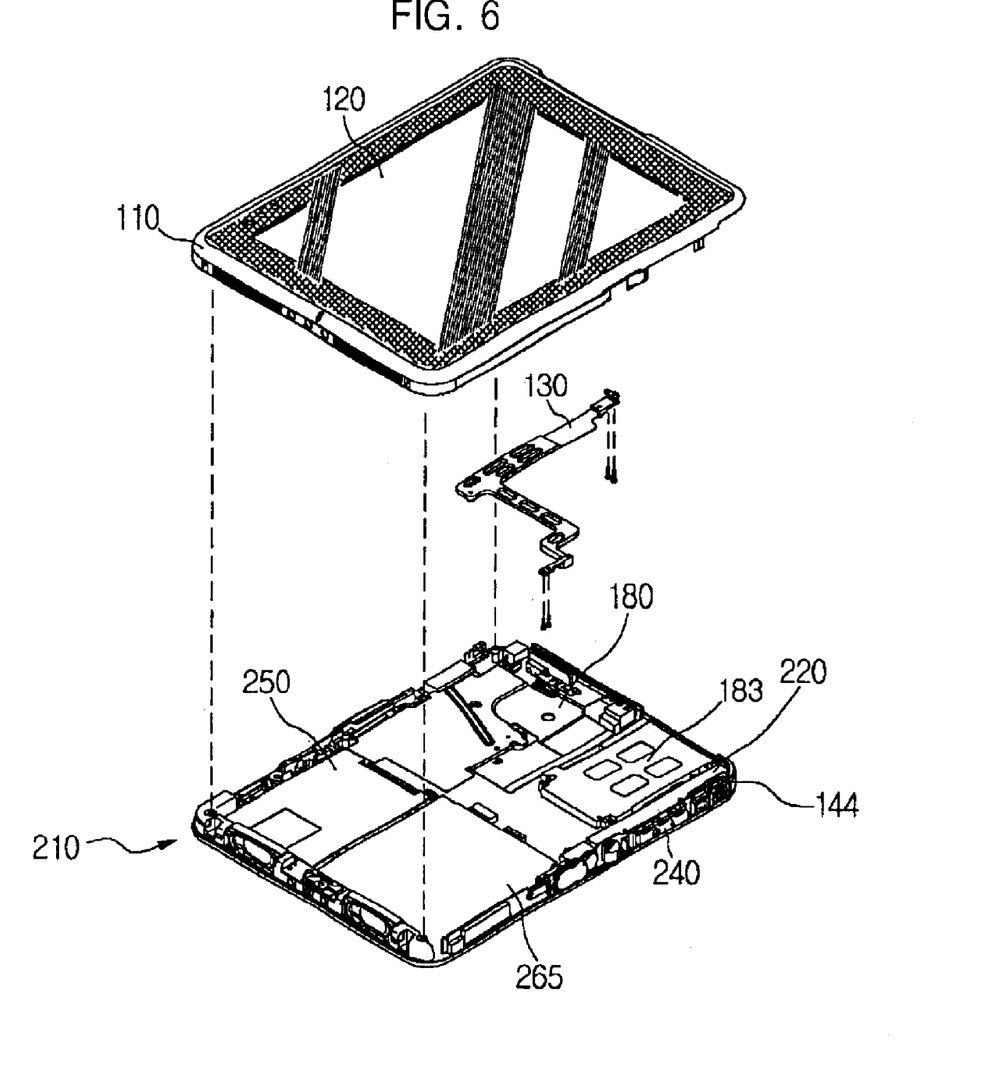
FIG. 6 is an exemplary exploded perspective view for attaching a supporting member to a front cover to which a panel is joined.
Figure 7:
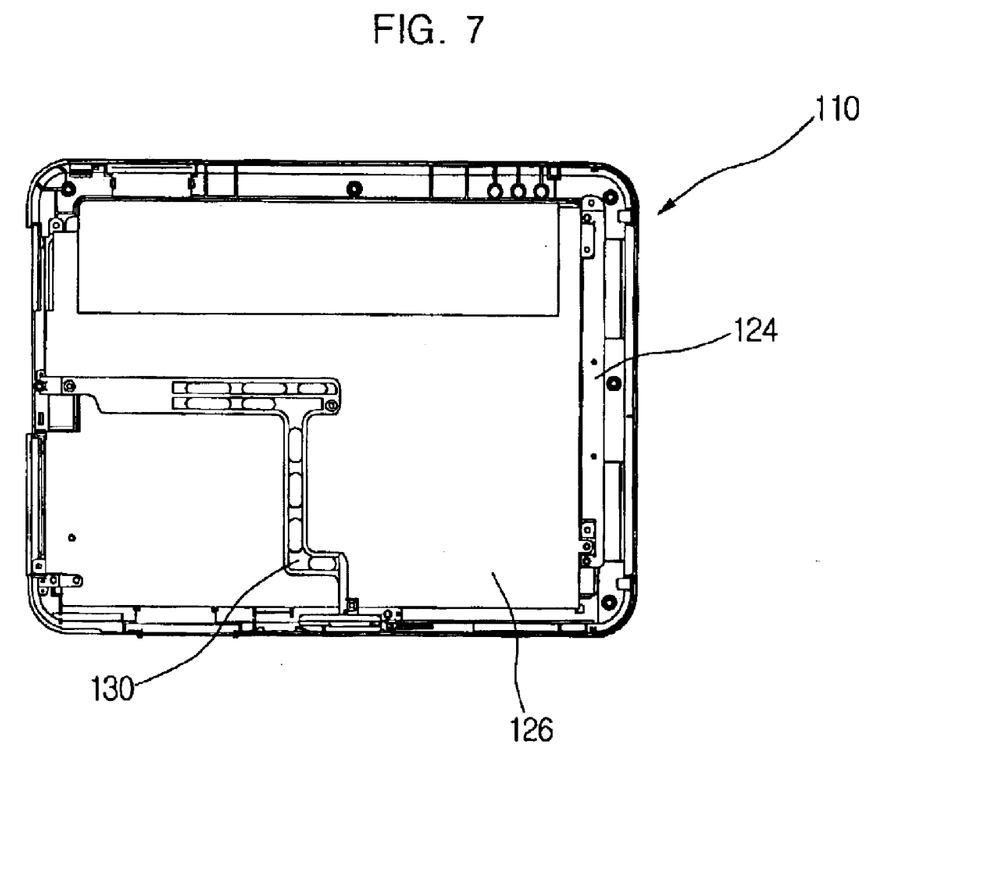
FIG. 7 is an exemplary backside view of a front cover in a portable computer system.
Figure 8:
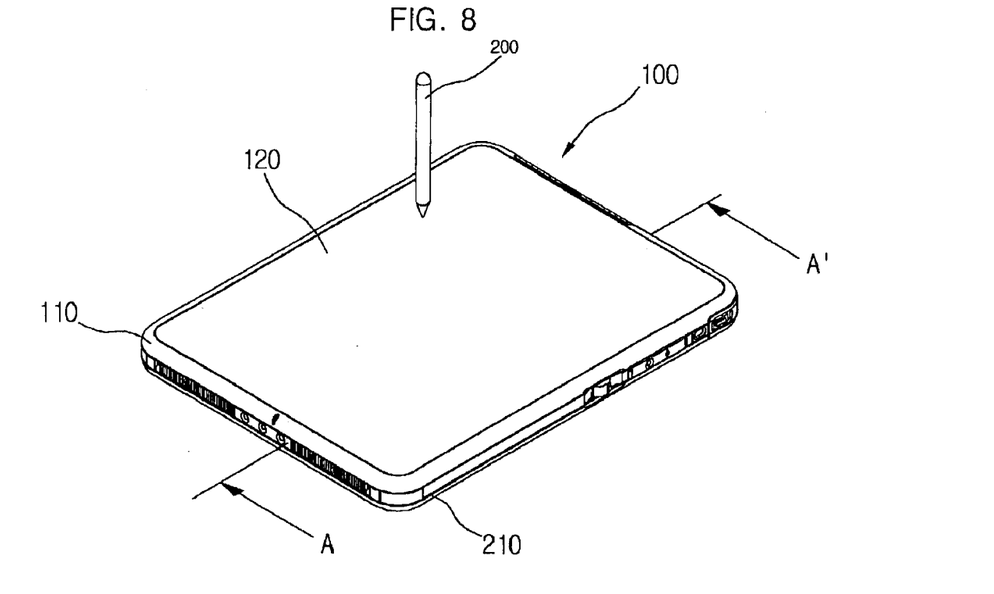
FIG. 8 is an exemplary perspective view for joining of a portable computer system.
Figure 9:
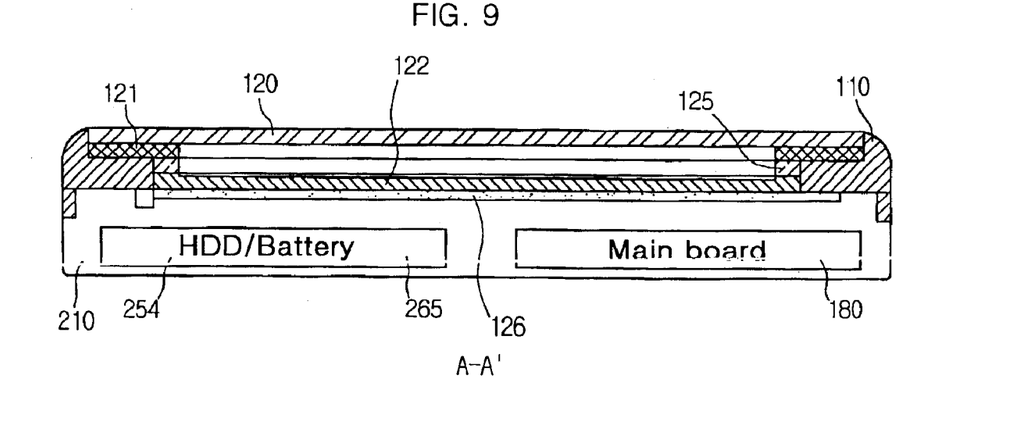
FIG. 9 is an exemplary cross-sectional view of FIG. 8, taken along line A–A'.

FIG. 2 through FIG. 9 are exemplary drawings illustrating embodiments of the present invention. FIG. 2 is an exemplary exploded perspective view of a portable computer system. FIG. 3 and FIG. 4 are exemplary drawings illustrating examples of joining process for a transparent panel and display panel. FIG. 5 is an exemplary backside perspective view of a front cover to which a transparent panel is attached. FIG. 6 is an exemplary exploded perspective view for attaching a supporting member to a front cover to which a display panel is joined. FIG. 7 is an exemplary backside view of a front cover. FIG. 8 is an exemplary perspective view for joining of a portable computer system. FIG. 9 is an exemplary cross-sectional view of FIG. 8, taken along line A–A'.

FIG. 2 illustrates a joining unit for different kinds of display panels of a portable computer system. For convenience, description will be made assuming a portrait direction, in which a longitudinal direction is longer than a width direction, for a default mode. Web pad 100 may include a front cover 110 and rear cover 210. Front cover 110 may include different kinds of display panels 122 and 126. A member for protecting and supporting display panels 122 and 126, main board 180 for system operation, a HDD, a battery, and/or a stylus holder 220 may be joined on rear cover 210.

Front cover 110 may be made of plastics and rear cover 210 may be made of magnesium. Accordingly, heat generated may be protected and weight may be reduced. Front cover 110 may have an opened inner structure. Front cover 110 may have a transparent panel receiving groove 11a on its outer periphery for transparent panel 120 made of tempered glass to be stuck on its front side. LCD panel 122 and digitizer panel 126 may be joined to an interior of front cover 110.

On rear cover 210, a system main machine (e.g. a HDD, a main board, etc.) for system driving, battery bracket 265, bracket 250 for attaching and detaching the HDD, stylus holder 220 for receiving stylus 200, and/or switches/buttons for controlling each function may be joined. If extraneous matter (e.g. dust) penetrates into front tempered glass 120 and LCD panel 122 mounted on the front cover 110, product quality may be deteriorated. Accordingly, a joining process for tempered glass 120 and LCD panel 122 may be performed in a clean room in order to prevent influx of the extraneous matter.

Tempered glass 120 may be made of transparent material having a predetermined strength. Tempered glass 120 may be inserted into a receiving groove 111a of front cover 110. Double sided tape 121 may be used according to embodiments as an adhesive. Double sided tape 121 may form a band shape having different widths in its horizontal direction and its vertical direction. Double sided tape 121 may be stuck on an outer periphery at the back of tempered glass 120, as illustrated in FIG. 3. A lower portion of double sided tape 121 may be attached to the back of tempered glass 120 and may be inserted into tempered glass receiving groove 111a. Tempered glass 120 may be stuck and fixed to front cover 110 without separate fastening with a screw.

Outer peripheral frame 123 for supporting the LCD panel may have an "L" shape so that LCD panel 122 is fixed in an interior of outer peripheral frame 123. A plurality of protuberances 122a projected on each side of an LCD panel, spaced by a predetermined interval, may be fit and joined into grooves 123a formed on outer peripheral frame 123. Fixing frame 124 may be joined, by screw 101, to right and left sides of outer peripheral frame 123 for supporting an LCD panel. For example, screw hole 102 may be formed on an edge at right and left sides of outer peripheral frame 123. Screw hole 102 may be positioned so that it faces screw hole 102 of fixing frame 124 and they may be fastened from a front direction to a rear direction of LCD panel 122 by means of screw 101.

Nonwoven gasket 125 may be stuck between LCD panel 122 and outer peripheral frame 123 and may be stuck on front cover 110, as illustrated in FIG. 3. Nonwoven gasket 125 stuck on LCD panel 122 may get stuck on double sided tape 121 attached to an edge of tempered glass 120. LCD panel 122 may be fixed on front cover 110 by fastening screw 101 to boss 111b of front cover 110 through screw hole 102 formed on fixing frame 124.

Width of double sided tape 121 may be larger than that of the tempered glass receiving groove 111a. Accordingly, part of double sided tape 121 may be exposed to an opening of front cover 110. For example, double sided tape 121 may be divided into an external region attached to tempered glass receiving 111a and an internal region to which nonwoven gasket 125 is attached. A front plane of LCD panel 122 may be sealed up by nonwoven gasket 125 having a predetermined thickness, double sided tape 121, and/or tempered glass 120, so that influx of extraneous matter can be prevented.

LCD panel 122 and digitizer panel 126 may be stacked and joined by a screw fastening through screw hole 102 formed on outer peripheral frame 123 and fixing frame 124. Screw fastening structure may not be exposed to a front plane of front cover 110, as LCD panel 122 may be supported by peripheral frame 123 and may be fastened by an inner boss.

Peripheral tempered glass 120 may be joined to a front plane of front cover 110. Accordingly, an external impulse may not directly transfer to LCD panel 122. Double sided tape 121 may play a role in buffering an external impulse, minimizing the impulse transferred to the panel. Front and side portions of LCD panel 122 may be sealed up, so that a display portion of LCD 110 is sealed up. Accordingly, an influx of extraneous matter is prevented and reliability of a product may be improved.

To prevent portions of different kinds of display panels 122 and 126, joined to front cover 110 from hanging down, a supporting member 130 may be provided. Supporting member 130 may have an "L" shape, as illustrated in FIG. 6 and FIG. 7. Supporting member 130 may support a central portion of display panels. Supporting member 130 may join front cover 110 by means of screw 101, when panels are joined in an interior of front cover 110. In embodiments, supporting member 130 may be for supporting a display panel and may be joined in form of a "+" or "T" shape. Supporting member 130 may have a structure opposing a main board on a rear cover. Supporting member 130 may be made of material capable of emitting heat generated from main board 180.

An inverter circuit board and an inverter cable may be provided to drive LCD panel 122. A LCD inverter circuit board and a digitizer controller board may be positioned and joined on a rear side of digitizer 126. An inverter may be installed on an inner side of an upper portion of LCD panel 122 and digitizer 126. An inverter may be for providing appropriate voltages. An auxiliary battery may be electrically connected to an inverter so that an auxiliary battery can provide power to LCD panel 122. An auxiliary battery may be for minimum operation, in case replacement of a main battery or a capacity shortage of the main battery.

Front cover 110 may be equipped with different kinds of display panels 122 and 126 inside. Front cover 110 may be joined to rear cover 210. Rear cover 210 may be attached to main board 180, a HDD, and/or a battery electrically connected to the main board. A HDD and a battery may be joined to a HDD attaching/detaching unit 250 and/or a battery attaching/detaching unit 265. Stylus holder 220 may for receiving and providing stylus 200 in rear cover 210. Button assembly 240 may include buttons for a variety of function control and a switch is joined on one side of the rear covet 210.

A disk drive socket may be provided for electrically interfacing with a CD-ROM drive and/or a floppy disk drive. If the disk drive socket is not used, a socket protecting lever which is opened when a drive connector is connected and which is closed when the drive connector is disconnected, may be provided in order to prevent influx of an extraneous matter. Front cover 110 and rear cover 210 may be attached to each other. Rear cover 210 may be fastened to an inner boss of front cover 110 by a screw. Accordingly, an interior of a web pad (e.g. including a main system) may be joined panels 122 and 126.

Main board 180 may have a PCMCIA (Personal Computer Memory Card International Association) card receiving portion 183, a USB (Universal Serial Bus) port, a serial communication port, communication port 184 which may include a LAN Local Area Network) port, a DC (Direct Current) input jack, and an IrDA (Infrared Data Association) port for infrared communication. Additionally, a port cover for protecting a communication port may be provided.

FIG. 2 through FIG. 6 illustrate an assembly having a smooth curved portion for performing a buffer function. The assembly may be joined to an edge portion of front cover 110 and rear cover 210. A joining portion in each edge of front cover 110 and rear cover 210 may be opened in its curved portion so that each side forms a smooth curve. First and second curved assemblies 141 and 142 may be joined to a curved portion located on a portion of a cover. Third and fourth curved assemblies 143 and 144 may be joined to a curved portion of a cover. The joining of assemblies 141, 142, 143, and 144 may use a hooking method. Assemblies 141, 142, and 143 may be joined to front cover 110 before assembly 144 is joined to the rear cover 210.

Each curved assembly on front and the rear covers, may be joined in a hook-hook hooking groove manner without fastening of a screw. A curved portion on a cover may be smooth to buffer external impulses. Accordingly, if a strong impulse is exerted, a curved assembly may be destroyed and the impulse is absorbed, while protecting parts installed within the cover.

FIGS. 8 and 9 are views of a web pad, in which a LCD panel may have the tempered glass attached to its front, spaced by a predetermined interval, and may have doubled sided tape and/or nonwoven gasket on its sides. Accordingly, a web pad may have front and sides sealed and able to absorb external impulses. LCD panel 122, digitizer panel 126, and/or main board 180 for system operation may be joined within one single pad on web pad 100. A stylus may be provided as an input means.

A web pad may be carried independently and used together with stylus 200. A keyboard may be selectively mounted on the web pad 100, so that a web pad may be used with the keyboard, the mouse, and/or the stylus 200. A user may input a desired character on a web pad using stylus 200 in case of editing a simple document or accessing to the web sites. A user may select a specific menu with stylus 200. Upon input of a character or selection from a specific menu with stylus 200, a coordinate of a digitizer panel corresponding to a high frequency signal (RF signal) may be generated in stylus 200, decoded at a digitizer's control unit, then transferred to main board 180. Main board 180 may control operation in response to input information.

If a key signal is input through input units (e.g. a keyboard and/or a mouse), a key signal input through a USB port and a keyboard connector may be transferred to a central processing part through a USB bus. A central processing part may display relevant information on LCD panel 122 in response to a key signal. If only web pad 100 is used, display information may be changed into a desired display mode, then the display mode may be changed into a portrait mode or a landscape mode. For example, if 1024*768 or 768*1024 is selected from display information, display status may be changed into a relevant display mode. As is apparent from foregoing embodiments of the present invention has a structure, in which elements are joined with the front and the rear covers separated, whereby disassembling of the cover and replacement of parts are easy to carry out.

One object of embodiments of the present invention is to provide a portable computer system having improved durability, capable of preventing external impulse from being delivered to a LCD (Liquid Crystal Display) or a main board, while maintaining a clean status of a display part, thereby providing more improved image of high quality.

Another object of embodiments of the present invention is to provide a portable computer system capable of achieving reduction in manufacturing costs and process efficiency by completing parts respectively through manufacture of primary elements constituting the portable computer system as a module, then finalizing at the final assembling process.

The foregoing and other objects and advantages of embodiments of the present invention are realized by the portable computer system including: a front cover 110 whose interior is opened and on a periphery in a front of which a transparent panel receiving groove 111a is formed; a transparent panel 120 having a predetermined strength; a double sided tape 121 for attaching the transparent panel 120 to the receiving groove 111a; frames 123 and 124 for fixing and supporting a LCD (Liquid Crystal Display) panel to the front cover 110; a nonwoven gasket 125 attached between the LCD panel and an outer peripheral frame, for being stuck on an internal region of the double sided tape; a digitizer panel 126 stacked on a backside of the LCD panel, for being joined to the front cover; a supporting member for supporting the LCD panel 122 and the digitizer panel 126; a rear cover 210 for being joined to the front cover; a main board 180 joined to the rear cover, for performing computing function; a HDD (Hard Disk Drive) attaching/detaching unit 250; a battery attaching/detaching unit 265; a button assembly 240 joined to the rear cover, equipped with a variety of function buttons; and a stylus holder 220 for receiving and providing a stylus 200.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of assembling a portable computer, comprising:

attaching a display to a front cover so as to form a first integral case;

attaching control circuitry directly to an inner surface of a back cover so as to form a second integral case, said control circuitry including a main board and memory for driving an overall operation of the portable computer; and attaching the front cover and the back cover, wherein in an operational mode of the portable computer, the front cover including the display is attached ontop of the back cover including the control circuitry such that the front cover including the display and the rear cover including the control circuitry form a single integral case, and wherein in a repair mode, the second integral case including both the control circuitry and back cover is configured to be detachably separated from the first integral case including both the display and front cover so as to expose the control circuitry such that repair to the control circuitry can be performed without disassembling the display from the front cover.

2. The method of claim 1, wherein attaching the front cover and the back cover comprises electrically coupling the display and the control circuitry.

3. The method of claim 1, wherein attaching the front cover and the back cover comprises physically coupling the display and the control circuitry.

4. The method of claim 3, wherein coupling the display and the control circuitry comprises installing a support between the display and the control circuitry.

5. The method of claim 4, wherein the support comprises a heat sink.

6. The method of claim 1, wherein the control circuitry further comprises a central processing unit.

7. The method of claim 1, wherein the control circuitry further comprises at least one of a central processing unit, a memory, a random access memory, a read only memory, an input interface, and a communication interface.

8. The method of claim 1, wherein the display is a liquid crystal display.

9. The method of claim 1, wherein attaching the display to the front cover is performed in a clean room.

10. A method for assembling a portable computer system, wherein the portable computer system comprises a case with a front cover whose inner side is opened and a rear cover joined to the front cover, a main board installed in an inside of the case for controlling overall operations of the portable computer system, an auxiliary unit electrically connected to the main board, a display means, and an input means, the method comprising:
attaching the display means to the front cover so as to form a first integral case;
attaching the input means to the front cover from a back of the display means;
fixing the display means and the input means to the front cover by a fixing means;
installing the main board and the auxiliary unit directly on an inner surface of the rear cover so as to form a second integral case; and
forming a single integral case by fastening and fixing the first and second integral cases by a fastening means,
wherein in an operational mode of the portable computer system, the front cover including the display means is attached on top of the rear cover including the main board and the auxiliary unit such that the front cover including the display means and the back cover including the main board and the auxiliary unit form the integral case, and
wherein in a repair mode, the second integral case including both the rear cover and main board and auxiliary unit is configured to be detachably removed from the first integral case including both the front cover and display means so as to expose the main board and auxiliary unit such that repair to the main board and the auxiliary unit can be performed without disassembling the display means from the front cover.

11. The method according to claim 10, wherein attaching the display means to the front cover is carried out in a clean room devoid of dust.

12. The method according to claim 10, further comprising joining a transparent panel to the front cover.

13. The method according to claim 12, wherein the transparent panel is joined to an outer side of the case by an adhesive means.

14. A portable computer system, comprising:
a case comprising a first cover and a second cover configured to be coupled to the first cover, wherein the first cover comprises a rim portion extending from edges of the first cover so as to form lateral sides of the case;
a main board including a variety of parts for controlling an overall main operation of the portable computer system, wherein the main board is attached directly to an inner surface of the second cover;
an auxiliary unit electrically connected to the main board and configured to assist in information processing;
a display device configured to display information through an opening formed in the first cover according to a first control signal from the main board;
an input device configured to transmit a second control signal to the main board according to a command from a user;
a first joining mechanism configured to attach the display device and the input device to the first cover from an inside of the case so as to form a first integral case;
a second joining mechanism configured to attach the main board and the auxiliary unit to the second cover so as to form a second integral case; and
a third joining mechanism configured to attach the first cover and the second cover to form a single integral case,
wherein in an operational mode of the portable computer system, the first cover including the display device is attached on top of the second cover including the main board and the auxiliary unit such that the first cover including the display device and the second cover including the main board and the auxiliary unit form the integral case, and
wherein in a repair mode, the second integral case including the main board and auxiliary unit and second cover is configured to be detachably separated from the first integral case including the display device input device and first cover so as to expose the main board and auxiliary unit such that repair to the main board and auxiliary unit can be performed without disassembling the display from the front cover.

15. The portable computer system according to claim 14, further comprising:
a receiving groove formed along an outer periphery of the opening formed in the first cover; and
a transparent panel whose outer periphery is configured to be attached to the receiving groove by an adhesive device.

16. The portable computer system according to claim 15, wherein the adhesive device comprises a double sided tape configured to be applied along the outer periphery of the opening formed in the first cover.

17. The portable computer system according to claim 16, wherein the double sided tape has an external region corresponding to a width of the receiving groove, and an internal region which projects inward beyond the external region to a predetermined width, and wherein an outer periphery of the display device which is joined to an inside of the first cover is attached to the internal region of the double sided tape.

18. The portable computer system according to claim 17, further comprising:
a dust excluding device configured to be inserted between the display device and the internal region of the double sided tape.

19. The portable computer system according to claim 18, wherein the dust excluding device comprises a nonwoven fabric.

20. The portable computer system according to claim 19, wherein an adhesive is applied to both sides of the dust excluding device.

21. The portable computer system according to claim 15, wherein the receiving groove is formed in steps of predetermined width so as to receive the outer periphery of the transparent panel.

22. The portable computer system according to claim 14, further comprising an absorbing member provided on an edge portion of the first cover and configured to absorb an impact.

23. The portable computer system according to claim 14, wherein the first cover is further configured to form a front surface of the case, and the second cover is configured to form a rear surface of the case.

24. The portable computer system according to claim 14, further comprising a peripheral frame configured to support the display device.

25. The portable computer system according to claim 24, wherein a plurality of grooves formed in the peripheral frame are configured to receive a corresponding plurality of protuberances formed on outer edges of the display device so as to secure the display device in the peripheral frame.

26. The portable computer system according to claim 24, further comprising a fixing frame configured to attach to the peripheral frame and to support the display device.

27. The portable computer system according to claim 26, wherein the fixing frame comprises a pair of fixing members, wherein the fixing members are configured to be attached to opposite ends of the fixing frame.

28. A portable computer system, comprising:

a case, comprising a front cover and a rear cover configured to be joined to the front cover;

a main board mounted on an inside of the case for accommodating a variety of parts for processing information;

an auxiliary unit electrically connected to the main board for assisting information processing;

a display means for displaying a variety of information through an opening formed in the front cover according to a first control signal from the main board;

an input means for inputting a second control signal to the main board according to a command from a user;

a first joining means for attaching and fixing the display means and the input means to the front cover from an inside of the case;

a second joining means for attaching and fixing the main board and the auxiliary unit to the rear cover;

a third joining means for attaching and fixing the front cover and the rear cover to each other;

a receiving groove formed in steps, having a predetermined width along an outer periphery of the opening formed in the front cover;

a transparent panel whose outer periphery is attached to the receiving groove by an adhesive means, wherein the adhesive means comprises double sided tape configured to be applied along the outer periphery of the opening formed in the front cover; and a barrier member positioned between the display device and the internal region of the double sided tape.

29. The portable computer system according to claim 28, wherein the doublesided tape comprises an external region corresponding to a width of the receiving groove, and in internal region which projects inward beyond the external region.

30. The portable computer system according to claim 29, wherein an outer periphery of the display device is configured to be attached to the internal region of the double sided tape.

31. The portable computer system according to claim 28, further comprising an absorbing member provided on an edge portion of the front cover and configured to absorb an externally applied force.

32. The portable computer system according to claim 28, wherein the main board is attached directly to an inner surface of the case.

33. A portable computer system, comprising:

a case comprising a first cover and a second cover configured to be coupled to the first cover, wherein the first cover comprises a rim portion extending from edges of the first cover so as to form lateral sides of the case;

a main board configured to receive a variety of parts for processing information;

an auxiliary unit electrically connected to the main board and configured to assist in information processing;

a display device configured to display information through an opening formed in the first cover according to a first control signal from the main board;

a peripheral frame configured to support the display device, wherein a plurality of grooves formed in the peripheral frame are configured to receive a corresponding plurality of protuberances formed on outer edges of the display device so as to secure the display device in the peripheral frame;

an input device configured to transmit a second control signal to the main board according to a command from a user;

a first joining mechanism configured to attach the display device and the input device to the first cover from an inside of the case;

a second joining mechanism configured to attach the main board and the auxiliary unit to the second cover; and a third joining mechanism configured to attach the first cover and the second cover.

* * * * *